US008000533B2

(12) United States Patent
Matsushita et al.

(10) Patent No.: US 8,000,533 B2
(45) Date of Patent: Aug. 16, 2011

(54) SPACE-TIME VIDEO MONTAGE (75) Inventors: Yasuyuki Matsushita, Beijing (CN);
Hong-Wen Kang, Pittsburgh, PA (US);
Xiaoou Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 982 days.

(21) Appl. No.: 11/559,852

(22) Filed: Nov. 14, 2006

(65) Prior Publication Data
US 2008/0112684 A1 May 15, 2008

(51) Int. Cl.
*G06K 9/46* (2006.01)
(52) U.S. Cl. ............... 382/190; 382/224; 382/225
(58) Field of Classification Search .......... 382/224, 382/305; 375/240.29, E7.166
See application file for complete search history.

(56) References Cited

U.S. PATENT DOCUMENTS

| 6,535,639 | B1 | 3/2003 | Uchihachi et al. | |
| 6,549,643 | B1 | 4/2003 | Toklu et al. | |
| 6,697,523 | B1 * | 2/2004 | Divakaran et al. | 382/173 |
| 7,016,540 | B1 | 3/2006 | Gong et al. | |
| 7,035,435 | B2 | 4/2006 | Li et al. | |
| 7,110,458 | B2 * | 9/2006 | Divakaran et al. | 375/240.25 |
| 2004/0207656 | A1 | 10/2004 | Lee et al. | |
| 2005/0180730 | A1 | 8/2005 | Huh et al. | |
| 2005/0262141 | A1 | 11/2005 | Miyamori | |

FOREIGN PATENT DOCUMENTS

| WO | WO2005001838 | 1/2005 |
| WO | WO2005050564 | 6/2005 |
| WO | WO2005072239 | 8/2005 |
| WO | WO2005103954 | 11/2005 |

OTHER PUBLICATIONS

Gong et al: "Video summarization and retrieval using singular value decomposition", Multimedia System 9: 157-168, Springer-Verlag, 2003.*
Kang et al: "Space-time video montage", IEEE, CVPR'06, Jun. 2006.*
Iacob, et al., "Video Summarization By Dynamic Scale-Space And Similarity Clustering Paradigm", 6 pages.
Nam, et al., "Dynamic Video Summarization and Visualization", ACM, 1999, pp. 53-56.
Smith, J., "VideoZoom Spatio-temporal Video Browser", IEEE Trans. Multimedia, vol. 1, No. 2, Jun. 1999, 20 pages.

* cited by examiner

*Primary Examiner* — Samir Ahmed
*Assistant Examiner* — Ruiping Li
(74) *Attorney, Agent, or Firm* — Lee & Hayes, PLLC (57) ABSTRACT

Systems and methods for space-time video montage are described. In one aspect, one or more arbitrary space-time volumes representing informative video portion(s) of at least one input video data sequence are identified. A video summary representing a montage of the at least one input video data sequence is generated for presentation to user from the one or more arbitrary space-time volumes.

20 Claims, 11 Drawing Sheets

SPACE-TIME VIDEO MONTAGE

BACKGROUND

Automatic video summarization techniques create short versions of original input video content. Such summarized videos facilitate user browsing of large amounts of video data. Conventional video summarization techniques generally summarize video content along a time axis. Although this approach can extract some basic information of the video, resulting summarized videos typically appear to be fast-forward versions of original video content, retaining a large amount of empty space in the background of respective video frames.

SUMMARY

Systems and methods for space-time video montage are described. In one aspect, one or more arbitrary space-time volumes representing informative video portion(s) of at least one input video data sequence are identified. A video summary representing a montage of the at least one input video data sequence is generated for presentation to user from the one or more arbitrary space-time volumes. This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

DETAILED DESCRIPTION

Overview

Existing video summarization techniques typically treat image frames as non-decomposable units to reduce temporal redundancy of an original video without addressing issues of video content spatial redundancies. As a result, resulting video summaries generally appear to be fast-forward versions of the original video. Such conventional video summaries generally lack motion contexts and retain empty background space in respective frames. In contrast, systems and methods for space-time video montage (described below in reference to FIGS. 1 through 11) treat input video data as three-dimensional (3-D) data to cut off spatio-temporal redundancies. To this end, the systems and methods locate and extract spatio-temporal informative video portions of an input video sequence by evaluating texture levels of respectable ones of the video portions. The extracted video portions are then represented as volumetric saliency layers to depict pixel content saliency distributions. Next, the systems and methods pack and merge the saliency layers into a three dimensional (3-D) volume for presentation as a video summary montage to a user. The video summary montage is generated such that a total amount of visual information provided by the montage is maximized. These and other aspects for the systems and methods for space-time video montage are now described in greater detail.

An Exemplary System

Although not required, systems and methods for space-time video montage are described in the general context of computer-executable instructions executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
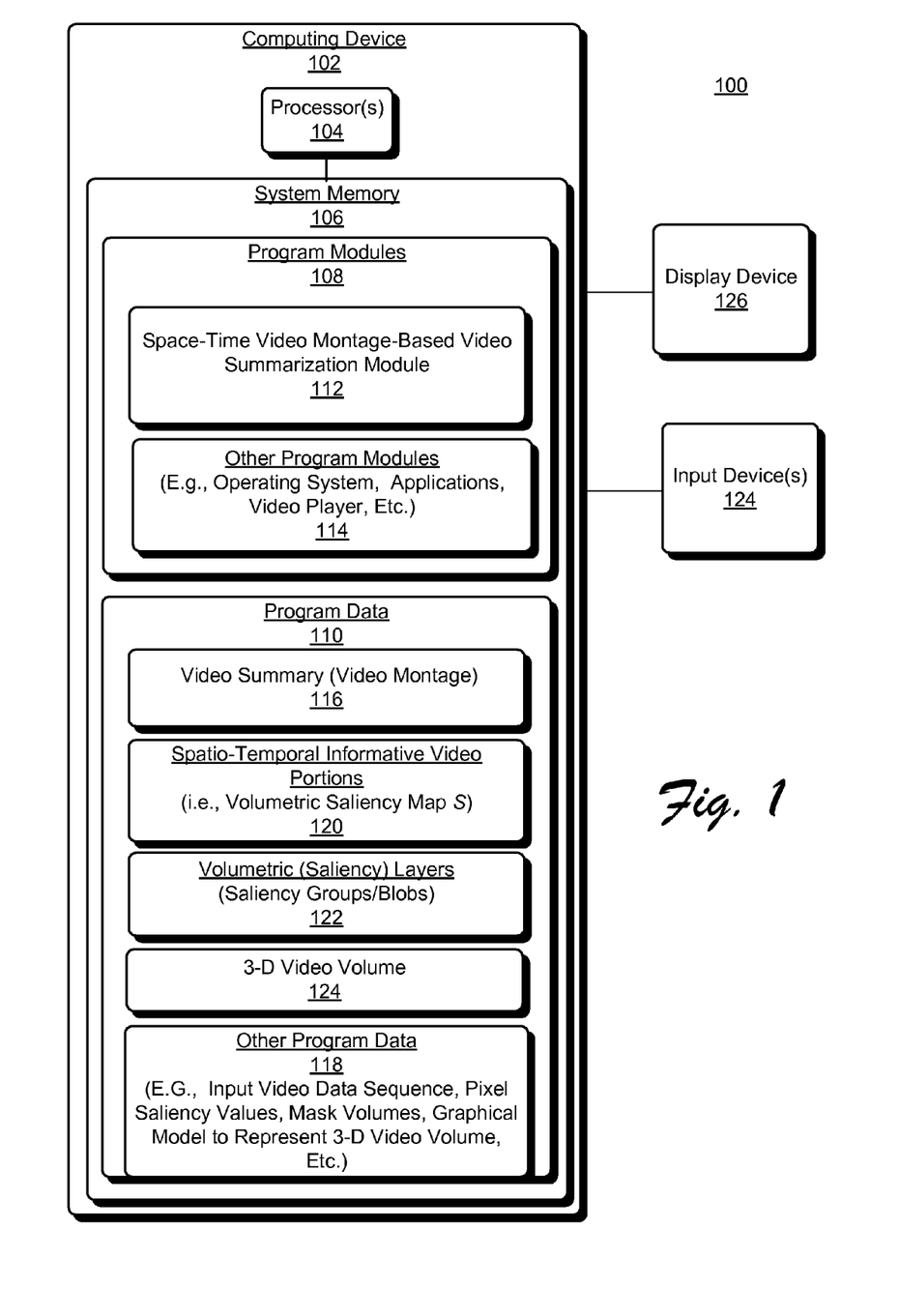
FIG. 1 shows an exemplary system for space-time video montage, according to one embodiment.

FIG. 1 shows an exemplary system 100 for space-time video montage, according to one embodiment. System 100 includes a computing device 102, for example a general purpose computing device, a server, a laptop, a mobile computing device, and/or so on. Computing device 102 includes one or more processors 104 coupled to a tangible computer-readable storage medium (system memory 106). Processor 108 may be a microprocessor, microcomputer, microcontroller, digital signal processor, etc. System memory 106 includes, for example, volatile random access memory (e.g., RAM) and non-volatile read-only memory (e.g., ROM, flash memory, etc.). System memory 106 comprises computer-program instructions executable by processor 104, and program data that is generated and/or used by respective ones of the computer-program instructions. Such computer-program instructions and program data are respectively shown as program modules 108 and program data 110. Program modules 108 include, for example, space-time video montage-based video summarization module 112 and "other program modules" 114 such as an Operating System (OS) to provide a runtime environment, and other applications such as device drivers, etc.

Space-time video montage-based video summarization module 112 ("video montage module 112") generates a video summary 116 from an input video data sequence. Such an input video data sequence is shown as a respective portion of "other program data" 118. To this end, video montage module 112: (a) analyzes the input video data sequence to locate and extract spatial-temporal informative (salient) video portions 120 from the input video data; (b) represents the extracted video portions 120 as volumetric layers ("saliency layers") 122 depicting content saliency distribution; (c) packs and merges the volumetric layers 122 into a 3-D video volume 124; and (d) generates the video summary 116 (a video montage) from the 3-D video volume for presentation to a user.

Figure 2:
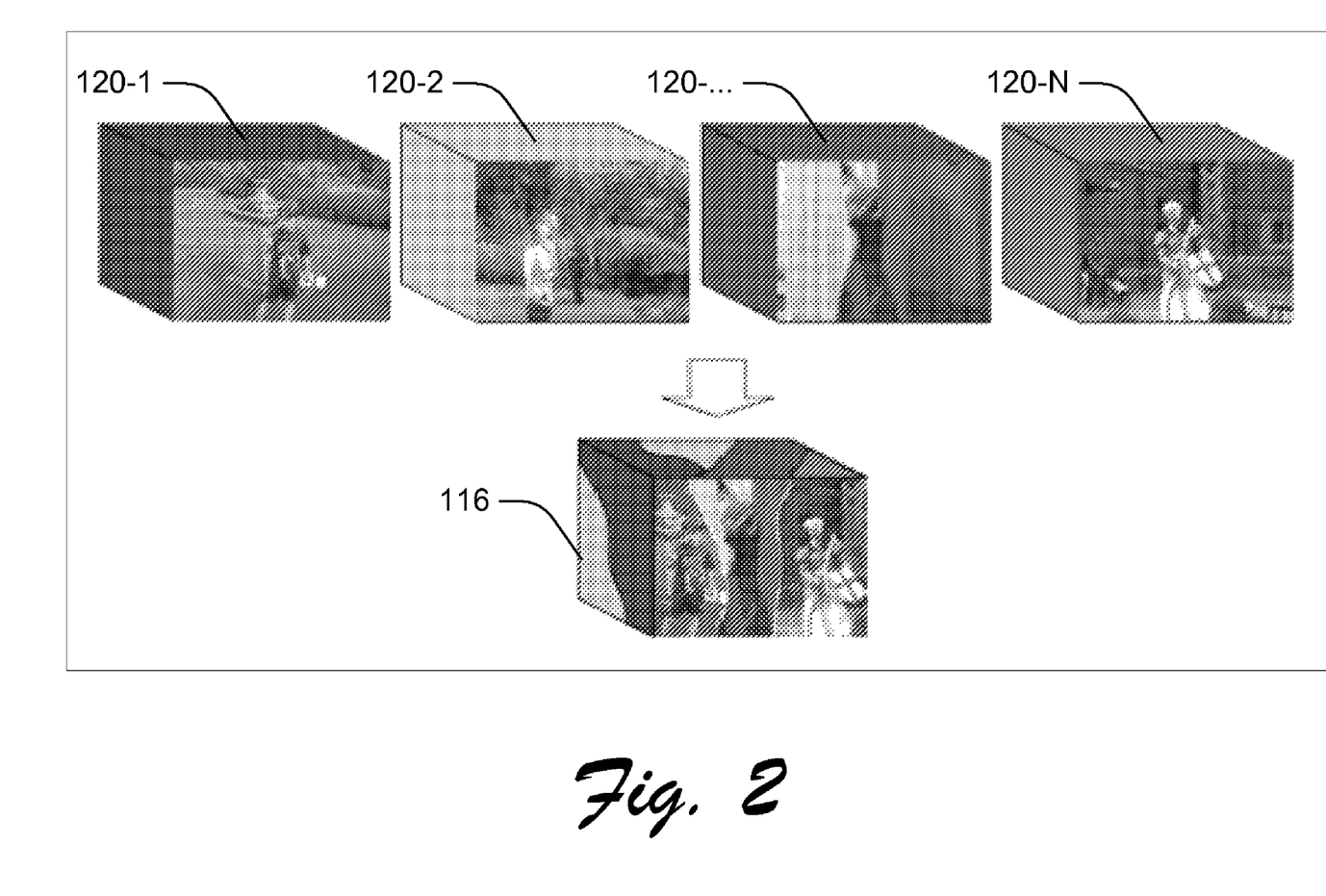
FIG. 2 shows an exemplary set of arbitrary space-time volumes extracted as informative video portions of an input video data sequence to generate a 3-D video volume, according to one embodiment.

FIG. 2 shows an exemplary set of arbitrary space-time volumes 120 (e.g., 120-1 through 120-N) extracted as informative video portions of an input video data sequence to generate a 3-D volume 124, according to one embodiment. For m input video volumes $V=\{V^i: i=1, \ldots m\}$ (i.e., input video data sequence(s)), video montage module 112 assigns saliency values to each input video data pixel to obtain the set of saliency volumes (i.e., spatio-temporal informative video portions 120) $S^{IN}=\{S^i: i=1, \ldots m\}$ that are associated with the input volume(s) V (i.e., the input video data sequence(s)). Each $S^{IN}$ may contain a number of isolated informative portions where high-saliency values are assigned. Thus, video montage module 112 utilizes saliency layers 122 to separately address those informative portions. As described below, saliency layers 122 $S=\{S_j^i : i=1, \ldots m; j=1, \ldots, n_i\}$ are extracted from the original saliency volumes $S^{IN}$, where $n_i$ is the number of layers 122 extracted from $S^i$. Notation $S_j^i$ represents j-th layer in the saliency volume $S^i$.

In this implementation, packing of the saliency layers 122 into 3-D video volume 124 such that the total saliency value grows to its maximum is approached as a variant of a classic combinatorial optimization problem; a Knapsack problem. The goal of the Knapsack problem is to pack a set of items into a limited size container such that the total importance of items becomes maximum. The variant approach implemented by video montage module 112 is based, for example, on the following differences from the conventional Knapsack technique: input items are video volumes (122), each of which can have a larger volume than the output volume (124); every video pixel in a respective video volume (122) is associated with a respective importance (saliency) measurement; and input items (122) may overlap other input item(s). Denoting output 3-D video volume 124 as $V_o$ and a saliency volume 122 as $S_o$, video montage module 112 packs the input video volumes V into the output video volume $V^o$ in a way that $S_o$ contains maximal saliency from S. This is equivalent to finding optimal translations $x_j^i$ of the saliency layers $S_j^i$, wherein i is an index of the input video data sequence/volume (here we expect to have multiple input volumes), j is the index for the saliency layers 122 that are defined for each input video volume. So, $x_j^i$ is the optimal translation of the j-th saliency layer of the i-th input video volume.

$S_j^i$ maximizes the following objective function:

$$\sum_{p \in S_o} f(S_j^i(p - x_j^i)), \quad (1)$$

where $f(\cdot)$ is the function which evaluates the saliency value for each pixel $p=(x, y, t)^T$, wherein (x,y) represents a spatial location, just like in an image space, and t represents a location in the temporal axis. It can be considered as the frame id in a video sequence. By (x,y,t) a pixel in a 3D volume is located. For instance, $f(\cdot)$ can be defined as $f(\cdot)=\max_j(\cdot)$ which takes the maximum saliency value at a pixel where the saliency layers are overlapped. Since the saliency layers are bounded by the original input video volume, it follows $S_j^i(x) = 0$ if $x \notin S_j^i$. Once the positions $x_j^i$ are determined, video montage module 112 assigns color values of the output video $V_o$ by composing the input video data according to the arrangements of saliency layers 122. In the scenario where $f(\cdot)=\max_j$ $(\cdot)$, for instance, by denoting V(p) to represent the color value at the pixel p in the video volume V, a simple form of the composition is described as $$V_o(p) = \left\{ V_i(p - x_j^i) : (i, j) = \operatorname*{argmax}_{(i,j)}\left(S_j^i(p - x_j^i)\right) \right\}. \quad (2)$$

For purposes of exemplary illustration and description, video montage module 112 generates a video summary 116 from a single input video data sequence, i.e., m=1. Under this condition, superscript i is dropped for purposes of clarification (e.g., $S^i$ becomes S, and $x_j^i$ becomes $x_j$). In another implementation, video montage module 112 generates a video summary 116 from multiple input video data sequences. Exemplary operations to generate the video summary 116 by finding and extracting informative video portions 120 to perform layer segmentation of the informative video portions and pack the layers 122 in an output video volume 124 are now described in greater detail.

Finding and Extracting Informative (Salient) Video Portions

Figure 3:
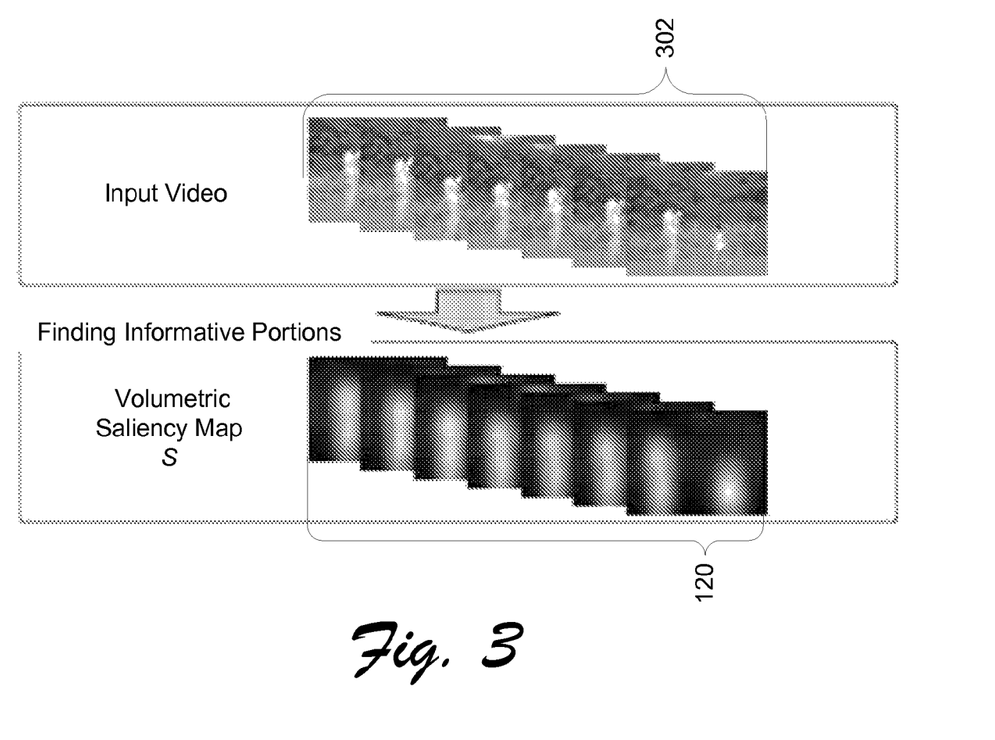
FIG. 3 shows an exemplary sequence to extract spatio-temporal informative video portions from input video data, according to one embodiment.

FIG. 3 shows an exemplary sequence of video frames 302 from which spatio-temporal informative video portions 120 are extracted, according to one embodiment. Content of the example video frames 302 is arbitrary, the frames merely being presented to show that as content of an input video frame sequence changes, corresponding informative video portion(s) located in respective ones of the frames 302 may also change. Specifically, video montage module 112 locates and extracts spatio-temporal informative video portions 120 (also referred to as a volumetric saliency map S in FIG. 3) of an input video data sequence by determining the salient textured portions of the input video data. To this end, a spatio-temporal saliency measure is defined using the spatio-temporal contrast. Here "spatio-temporal contrast" means "spatio-temporal saliency". In this implementation, the spatio-temporal saliency is obtained by computing intensity differences in 3D. Spatio-temporal saliency $S(\cdot)$ at a video pixel position p of the input video data is defined using neighboring pixels $q \in Q$ (q represents the pixel and Q represents the entire set of neighboring pixels) as $$S(p) = G * \sum_{q \in Q} d_S(p, q), \quad (3)$$

where the distance function $d_s$ measures contrast between pixel p and q. In one implementation, |Q| is a set of pixels in a 5×5×5 window. Window size can be changed in a different implementation. $d_s$ is defined as the L2 norm distance of the intensities as follows:

$$d_s(p,q)=|I(p)-I(q)|^2. \quad (4)$$

In this implementation, intensity I is computed by I=0.3R+ 0.6G+0.1B, wherein "R" represent red, "G" represents green, and "B" represents blue. The values 0.3, 0.6 and 0.1 are commonly used values for RGB→gray-level intensity conversion. The number of neighboring pixels |Q| in Eq. (3) is determined by the size of the Gaussian kernel $\sigma_s$, which controls sensitivity of local stimulus. Once the saliency values are computed for all of the pixels in the video volume, video montage module 112 normalizes the saliency values, e.g., to a range of [0,1].

Segmentation of Saliency Volume to Create Saliency Layers

Figure 4:
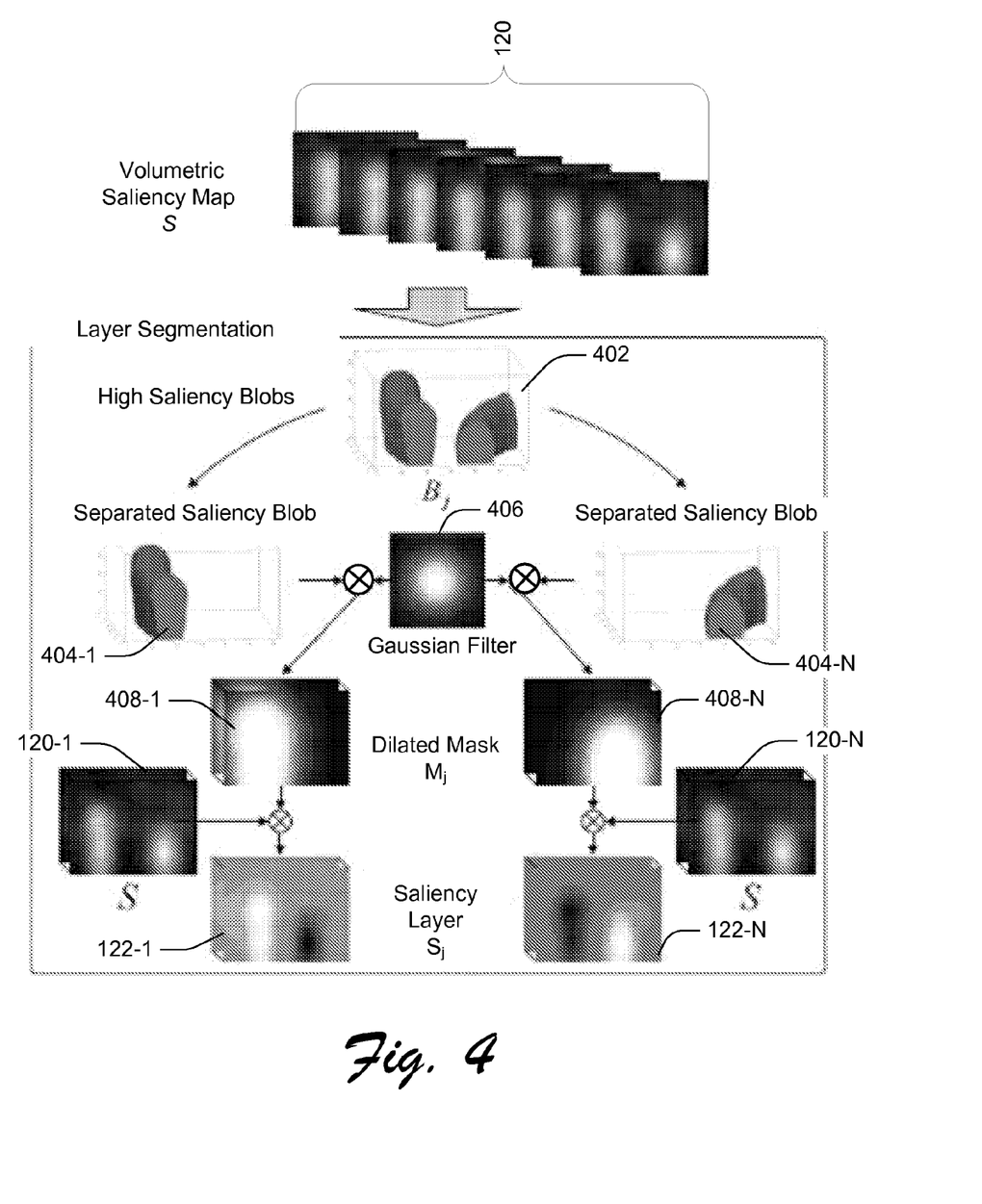
FIG. 4 shows exemplary segmentation of volumetric saliency maps to create saliency layers, according to one embodiment.

FIG. 4 shows an exemplary segmentation of volumetric saliency maps 120 to create saliency layers 122, according to one implementation. In the original volumetric saliency map S (spatio-temporal informative video portions 120), there exist a set of high saliency portions in a low-saliency background. To treat the high-saliency portions separately, video montage module 112 performs layer segmentation of each volumetric saliency map S so that each layer 122 contains only one salient portion. In this implementation, layer segmentation operations include three steps: (a) segmentation of high-saliency portions, (b) morphological growing of saliency portions, and (c) assignment of negative saliency values.

Segmentation of High Saliency Portions: In the first stage of layer segmentation operations, video montage module 112 generates saliency groups/blobs 402 that represent the high-saliency portions in the input video data. To locate the high-saliency portions and separate them from background data, video montage module 112 segments original saliency values of S into three different groups, i.e., high-saliency, mid-saliency and low-saliency groups. For purposes of exemplary illustration, such high-saliency, mid-saliency, and low-saliency groups are collectively shown as "saliency groups" in a respective portion of the "other program data" 118 of FIG. 1. In this implementation, a high saliency group represents the informative parts of the input video data, a middle saliency group represents edges or skirts of informative portions of video data, and a low-saliency group represents background portions of the input video data. In this implementation, video montage module 112 utilizes K-means clustering, wherein K=3, to generate the saliency groups. When n isolated (separated) saliency portions 404 (i.e., separated saliency blobs 404-1 through 404-N) are found, video montage module 112 generates n saliency blobs B={$B_j$: j=1, . . . , n}. Blob $B_j$ represents a set of pixels in the corresponding j-th high saliency video portion.

Dilation of Saliency Blobs: Once saliency blobs B (404) are identified, video montage module 112 generates mask volumes M={$M_j$: j=1, . . . , n} from B to dilate (expand) the saliency blobs. Dilation operations simulate spread of high saliency portions on other surrounding portions of the video data (i.e., simulate effect of the high-saliency portion on adjacent pixels). In this implementation, video montage module 112 generates a Gaussian filter 406, i.e., the mask volume $M_j$ for the saliency blob $B_j$, as follows:

$$M_j(p) = \exp\left(-\frac{d(p, B_j)^2}{2\sigma_M^2}\right) \forall p \in S_j, \quad (5)$$

where distance function d is defined as $$d(p, B_j) = \min_{q \in B_j} \|p - q\|. \quad (6)$$

In Eq. (5), Gaussian kernel sigma $\sigma_M$ controls size of dilation. In one implementation, for example, size of dilation is set to 50. In other implementations, for example, dilation size can be set to different values. Video montage module 112 utilizes the dilated mask volumes $M_j$ (e.g., 408-1 through 408-N) to generate saliency layers (e.g. 122-1 through 122-N), i.e., S={$S_j$}, by taking the product with the original saliency volume S (e.g. 120-1 through 120-N) for each pixel p as $$S_j(p) = M_j(p)S(p) \forall p \in S_j. \quad (7)$$

Figure 5:
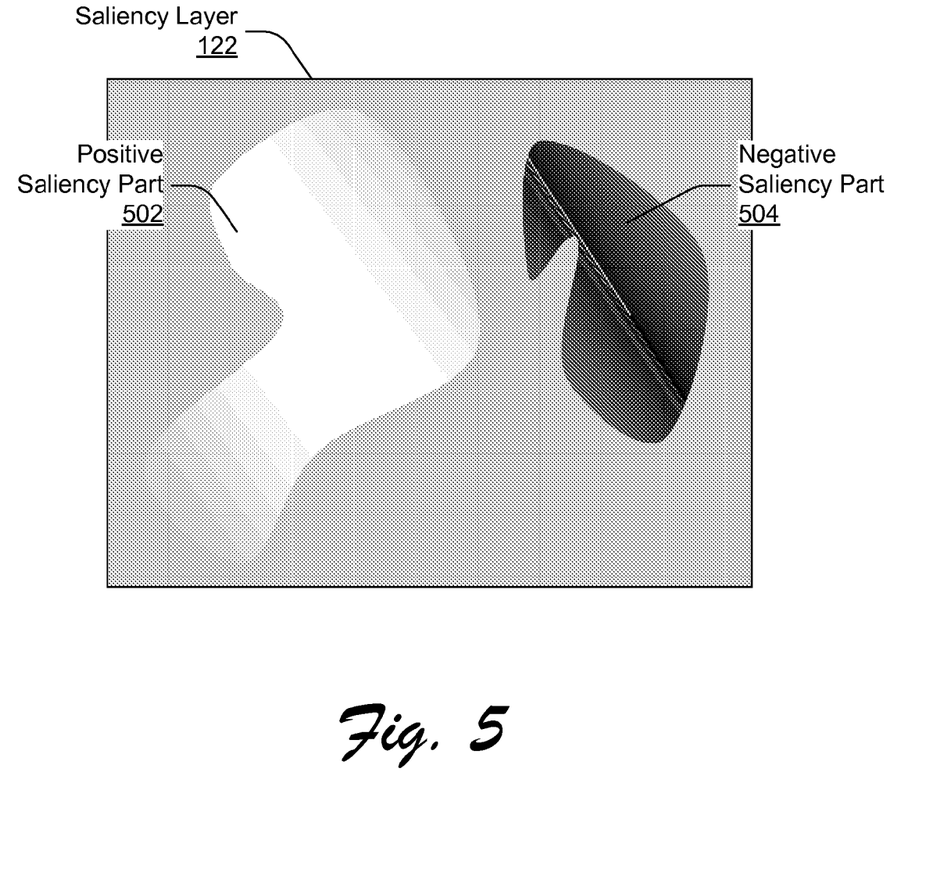
FIG. 5 shows an exemplary saliency layer, according to one embodiment.

Assigning Negative Saliency Values: FIG. 5 shows an exemplary saliency layer 122, according to one embodiment. As shown, and in one implementation, a saliency layer 122 includes both positive saliency portions 502 and negative saliency portions 504. In a saliency layer S, positive saliency values are assigned in the layer 122 to represent corresponding salient video portions (e.g., please see saliency part 302). Additionally, negative saliency values are assigned to respective portions (e.g., please see saliency part 304) of the saliency layer 122 based on salient portions of other salient layer(s) 122. This is to reduce importance of certain ones of the pixels in a specific saliency layer based on higher saliency pixels in one or more other saliency layers 122. This reduces possibility of multiple appearances of the same salient portions in the final video montage 116 (output video). Accordingly, video montage module 112 assigns negative saliency values to data in each layer $S_j$ as follows:

$$S_j(p) \leftarrow S_j(p) - \sum_{k \neq j} S_k(p) \forall p \in S_j. \quad (8)$$

Packing Saliency Layers into a 3-D Video Volume

Figure 6:
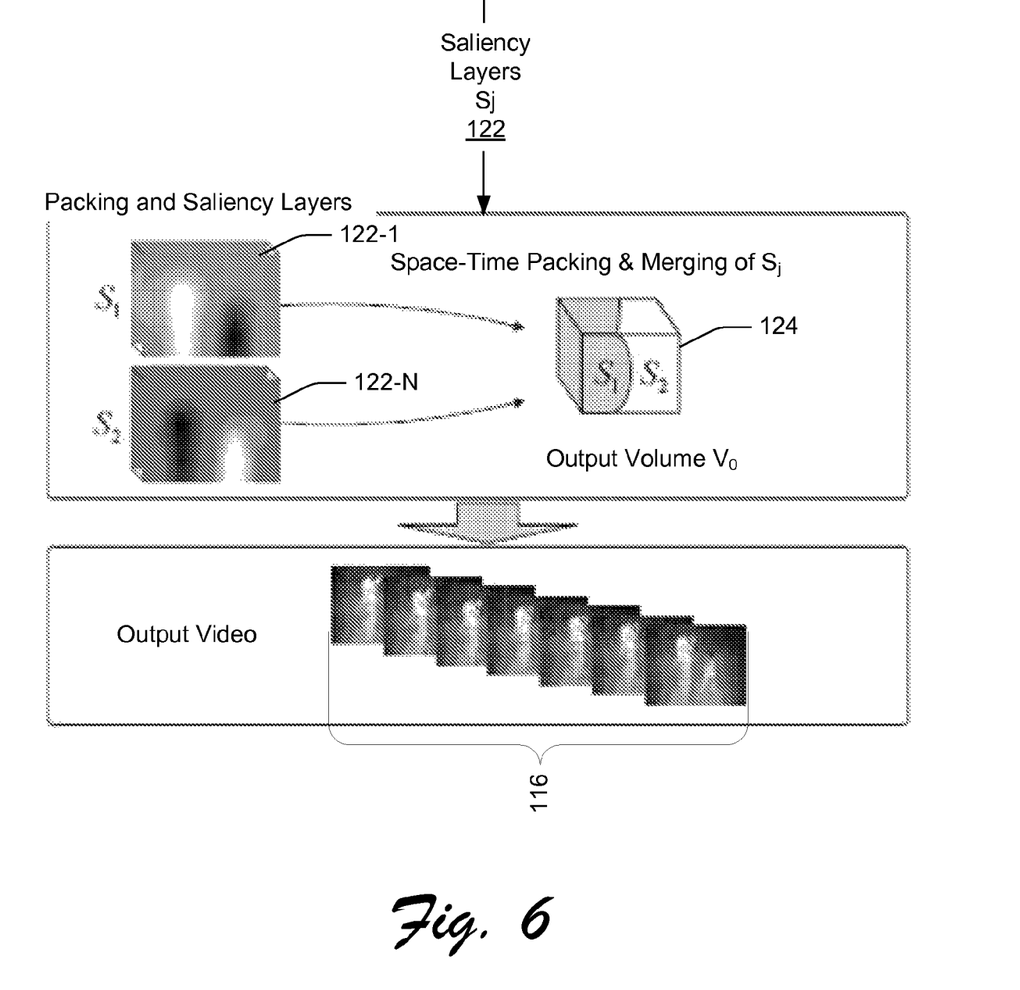
FIG. 6 illustrates an exemplary sequence to pack saliency layers into an output video volume for a video summary montage, according to one embodiment.

FIG. 6 illustrates an exemplary sequence for packing saliency layers 122 into an output video volume 124 to generate a corresponding video montage 116, according to one embodiment. Content of the example video summary frames 116 of this example is arbitrary, the frames merely being presented to show a presented summary result. Given saliency layers S 122, video montage module 112 identifies an optimal arrangement of S in the 3-D video volume $V_o$ (124) such that $V_o$ will contain maximal informative portions of the original input video data sequence. In this implementation, video montage module 112 implements a multi-resolution first-fit algorithm to efficiently compute the solution. The first-fit algorithm is a sequential optimization algorithm that first orders the items and places the items one-by-one in the container. In the space-time video montage scenario of system 100, saliency layers S 122 are ordered by size of corresponding saliency blobs B. Ordering the saliency layers 122 by size results in dense packing as compared to ordering the saliency layers 122 in a different manner.

In this implementation, saliency layers S are ordered in descending order, i.e., a smaller index represents a larger size. In a different implementation, saliency layers S are ordered in an ascending order. In this implementation, output saliency volume $S_o$, which has the same volume as $V_o$, is utilized to achieve the optimization. In this implementation, output volume packing operation include, for example, positioning saliency layers 122 and merging saliency layers 122 into the 3-D video volume 124. To this end, video montage module 112 proceeds sequentially starting from i=1 to n with an initialization that fills the output saliency volume $S_o$ (i.e., 3-D video volume 124) with $-\infty$ (i.e., a minimum value that a variable can have (e.g., FLT_MIN for float datatype) is assigned). Output saliency blob $B_o$ is initialized by filling with zeros. Output saliency blob $B_o$ is used as a buffer when computing the seam among input blobs. $B_o$ is a binary buffer, and it is used in this implementation for purposes of computation when merging input blobs, and eventually discarded once the computation is done.

Positioning Saliency Layers: An optimal position $x_j$, wherein j is an index for associating a particular x with a j-th saliency layer 122, is sought for a saliency layer $S_j$ (122) to maximize a total saliency value in $S_o$. To achieve this, video montage module 112 implements coarse-to-fine multi-resolution search operations. That is, saliency layer positioning is first sought for all possible positions in a coarse scale. Position $x_j$ is then refined by searching a local region at a finer scale. The amount of saliency gain $\Delta S_o$ in the output saliency volume $S_o$ is computed by $$\Delta S_o(x_j) = \sum_{p \in V_o} \{S_j(p - x_j) - S_o(p)\}, \quad (9)$$

and the optimal position $\hat{x}_j$ for the saliency layer $S_j$ is obtained by finding the position $x_j$, which maximizes the saliency gain by $$\hat{x} = \underset{x}{\mathrm{argmax}}\{\Delta S_o(x)\}. \quad (10)$$

Merging Saliency Layers: Once an optimal position $\hat{x}_j$ is determined for a saliency layer $S_j$ (122), the saliency layer $S_j$ is merged to the output saliency volume $S_o$. At the same time, video montage module 112 simultaneously assigns color values to respective ones of the pixels. A straightforward approach of merging two saliency volumes $S_o$ and $S_j$ is finding the maximum saliency value for each pixel p. In this case, the saliency value $S_o$ and the color value $V_o$ at the pixel p are determined by $$S_o(p) \leftarrow \max\{S_o(p), S_j(p - \hat{x}_j)\},$$

$$V_o(p) = V(p - \hat{x}_j) \text{ if } S_j(p - \hat{x}_j) > S_o(p). \quad (11)$$

This approach, however, may produce a choppy result, since it is a local operation that does not consider the connectivity of the video portions. To address this, and in this implementation, video montage module 112 generates a visually plausible output video 116 by merging saliency layers 122 using three different soft constraints: (1) maximizing saliency, (2) maximizing continuity of high-saliency portions and (2) maximizing color smoothness at the seam boundaries. Specifically, video montage module 112 builds a graphical model $G = \langle N, A \rangle$ to represent output saliency volume $S_o$. In this model, N represents a set of nodes which correspond to pixels p in $S_o$, and A represents a set of arcs which connect nodes. Nodes in N are denoted as p, which is also used to represent pixels. Each node p has six neighboring nodes connected by arcs in the spatial and temporal directions.

Merging saliency layer $S_j$ and an output saliency volume $S_o$ is viewed as a binary labeling operation, i.e., assigning each node p a label $\{0,1\}$ representing $S_o$ and $S_j$, respectively. Notation $p^L$ is used to represent the label value of the node p. To efficiently optimize labeling operations under the soft constraints, an energy function E is defined as follows:

$$E = \sum_{p \in N} E_1(p) + \alpha \sum_{p \in N} E_2(p) + \beta \sum_{\substack{p \in N \\ a_{pq} \in A}} E_3(p, q), \quad (12)$$

where $a_{pq}$ represents the arc which connects nodes p and q. The optimization problem is addressed with a known graph cut algorithm. In one implementation, $\alpha = 1.0$, and $\beta = 50.0$. Equation (12) represents a regularized framework, wherein coefficients (e.g., $\alpha$ and $\beta$) are generally obtained empirically and are fixed (i.e., they do not need to be changed with different input). Terms $E_1$, $E_2$ and $E_3$ correspond to saliency energy, likelihood energy and coherence energy, respectively, each of which corresponds to the soft constraints described above.

Saliency Energy: In Eq. (12), $E_1$ represents an energy term that contributes to maximizing a total saliency value in output saliency volume $S_o$. In this implementation, $E_1(p)$ is defined as follows.

$$\begin{cases} E_1(p) = s_m - (1 - p^L) S_o(p) - (p)^L S_j(p) \\ s_m = \max_p \{S_o(p), S_j(p)\} \end{cases}, \quad (13)$$

wherein $S_m$ represents the greater value of $S_o(p)$ and $S_j(p)$. The term $E_1$ is minimized when the total saliency value of the merged saliency volume 124 is maximized.

Likelihood Energy: The term $E_2$ regulates continuity of the high-saliency portions in both $S_0$ and $S_j$. By measuring the color similarity of the video pixels with the colors in high saliency portions, video montage module 112 evaluates continuity of high-saliency portions. In this implementation, dominant colors are clustered and similarity of the colors is determined. To compute the dominant colors, video montage module 112, for example, utilizes saliency blobs $B_j$ and $B_o$ to determine the high-saliency pixels. Color values obtained via $B_j$ and $B_o$ are clustered independently with K-means. Computed mean colors are denoted by $\{C_k^{B_o}\}$ for representing the major colors associated to $B_o$, and $\{C_k^{B_j}\}$ for the major colors associated to the saliency layer $B_j$. In this implementation, video montage module 112 utilizes 15 clusters (k=1, ..., 15), although different numbers of clusters could also be used. For each node p, the minimum color distance between $V_o(p)$ and the mean colors $\{C_k^{S_o}\}$ is computed according to the following equation:

$$d_p^{B_o} = \min_k \| V_o(p) - C_k^{B_o} \|. \quad (14)$$

The minimum color distance between $V(p - \hat{x}_j)$ and the mean colors $\{C_k^{B_j}\}$ is also obtained by $$d_p^{B_j} = \min_k \| V(p - \hat{x}_j) - C_k^{B_j} \|. \quad (15)$$

Using these two color distances, energy term $E_2(\cdot)$ is defined as follows.

$$\begin{cases} E_2(p^L=0)=0, E_2(p^L=1)=\infty, \forall\, (p \in B_o,\, p \notin B_j) \\ E_2(p^L=0)=\infty, E_2(p^L=1)=0, \forall\, (p \notin B_o,\, p \in B_j) \\ E_2(p^L=0)=\dfrac{d_j^{B_o}}{d_j^{B_o}+d_j^{B_j}},\ E_2(p^L=1)=\dfrac{d_j^{B_j}}{d_j^{B_o}+d_j^{B_j}},\ \forall\, p \in \text{elsewhere} \end{cases} \quad (16)$$

With the energy term $E_2$ pixels that are similar in color tend to be connected to one another.

Coherence Energy: The third term $E_3$ in Eq. (12) is designed to retain color coherence at a seam between $S_o$ and $S_j$. The term is penalized when a pair of neighboring nodes (p, q) connected by the arc $a_{pq}$ is labeled differently. In this implementation, coherence energy $E_3$ is defined as follows.

$$E_3(p,q)=|p^L-q^L|\cdot\|H(p)-H(q)\|^2, \quad (17)$$

where H(x) is defined as $$H(x)=(1-x^L)V_o(x)+x^L V(x-\hat{x}_j). \quad (18)$$

In Eq. (17), $\|\cdot\|^2$ is the square of the $l^2$ norm. As shown in Eq. (17), $E_3$ becomes zero when the same labels are assigned to p and q. Only when different labels are assigned, e.g., (0,1) and (1,0), is $E_3$ penalized by color discontinuity. $E_3$ satisfies regularity conditions for graph representation.

Optimization and Update: To achieve the merging step, video montage module 112 applies the graph cut algorithm only to a volume where $S_o$ and $S_j$ are overlapped. Therefore, the size of the graph G is reduced to the overlapped volume. Once labels are assigned to all the nodes, output saliency volume $S_o$ and output video $V_o$ are updated as follows:

$$S_o(p) \leftarrow \begin{cases} S_o(p) & \text{if } p^L=0 \\ S_j(p-\hat{x}_j) & \text{else} \end{cases}, \quad (19)$$

$$V_o(p) \leftarrow \begin{cases} V_o(p) & \text{if } p^L=0 \\ V(p-\hat{x}_j) & \text{else} \end{cases}. \quad (20)$$

In addition, output saliency blob $B_o$ is updated as $$B_o(p) \leftarrow \begin{cases} B_o(p) & \text{if } p^L=0 \\ B_j(p-\hat{x}_j) & \text{else} \end{cases}. \quad (21)$$

Exemplary Space-Time Video Montage Results

Figure 7:
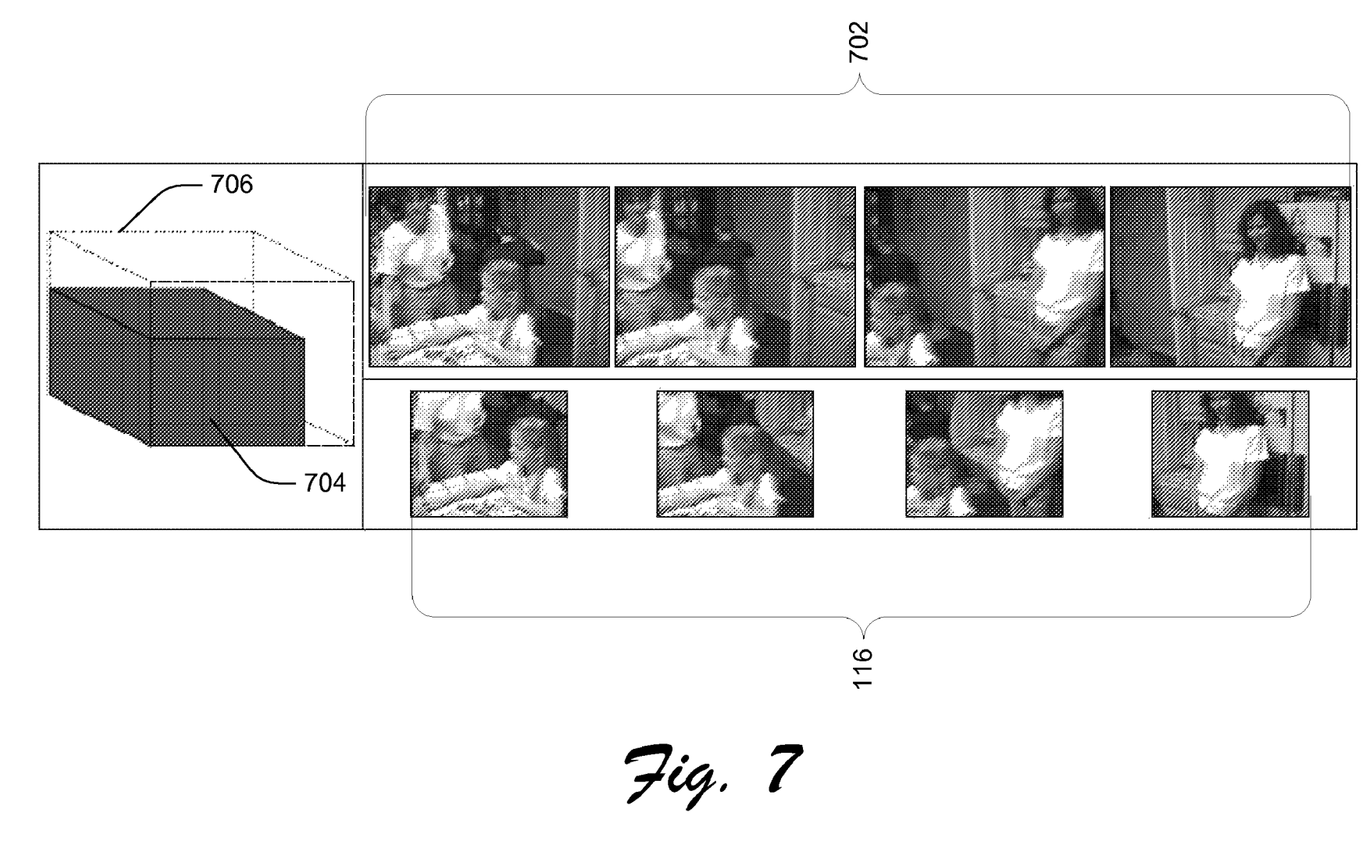
FIG. 7 shows an exemplary video summary montage resulting from spatial scale-down of original input video data, according to one embodiment.

FIG. 7 shows an exemplary video summary (video montage) 116 resulting from spatial scale-down of an original input video data sequence 702, according to one embodiment. In spatial-scale down, output video volume 704 (i.e., the volume of the video summary 116) is spatially smaller than volume 706 of the original input video data sequence, while the temporal length remains the same. For example, in one implementation, resolution of the original input video data sequence may be 320×240 with 167 frames, and that of the output video is 220×176 with the same number of frames. In this example, the top row of FIG. 7 shows four frames from the original input image sequence. The methodology and operations of video montage module 112 result in an output video 116 that has the smaller spatial size, as shown in the bottom row of the figure. In respective ones of the output images of video summary 116, boundaries of the different video portions are drawn to clearly show the exemplary composition result.

Figure 8:
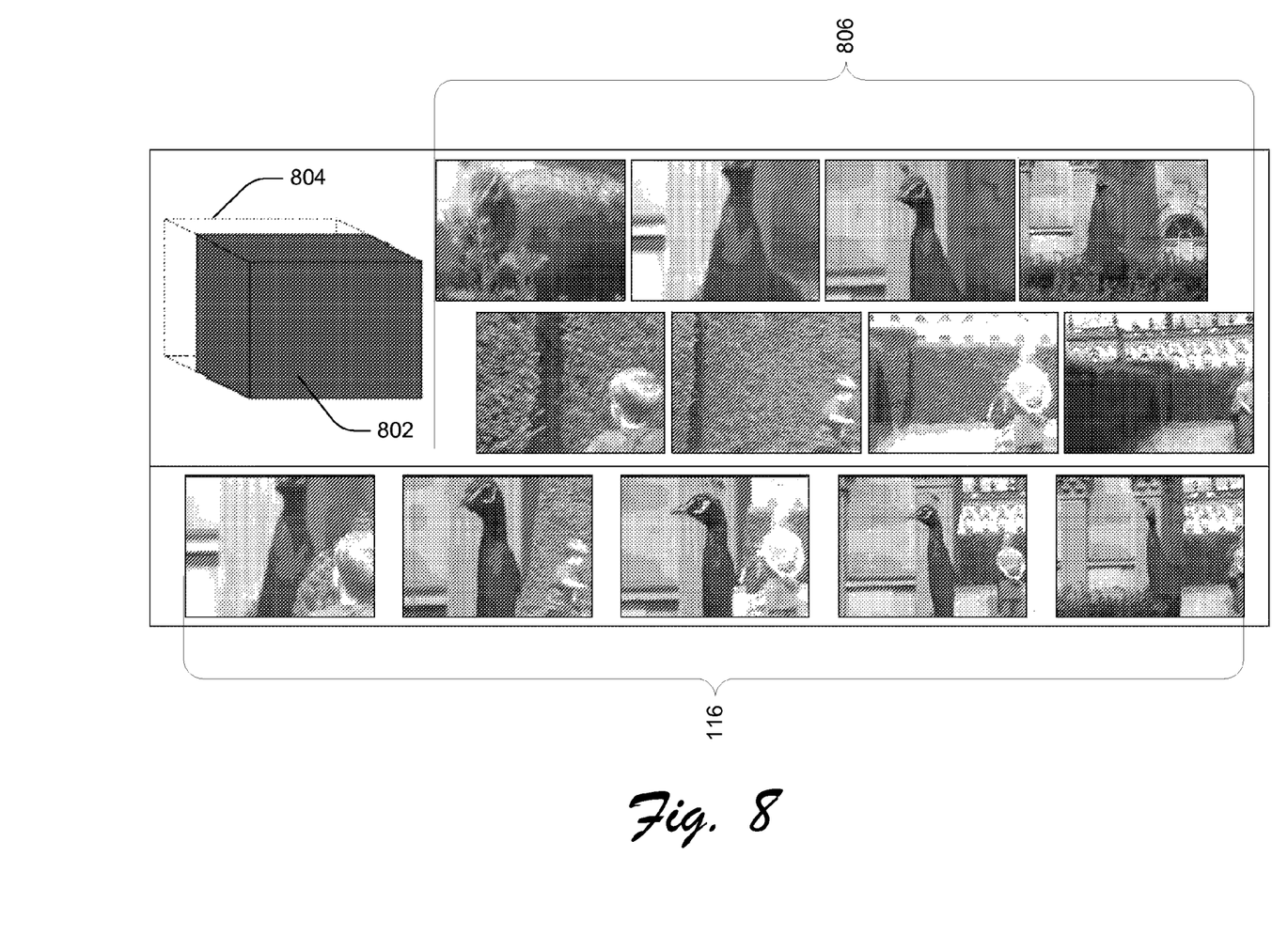
FIG. 8 shows exemplary results of temporal scale-down operations of original input video data, according to one embodiment.

FIG. 8 shows exemplary results of temporal scale-down operations of the systems and methods for space-time video montage, according to one embodiment. In temporal scale-down operations, output video volume 802 is temporally smaller than that of original volume 804 associated with the input video data sequence, while the spatial size of the resulting image frames in the video montage 116 remain the same. In this example, the top two rows show eight (8) image frames from an original 270 frame video with resolution 320×240. It can be appreciated that different numbers of frames and image resolutions can be used. The bottom row shows five frames from the resulting video summary 116, which in this example includes 110 frames of video with the same resolution as the input video data sequence 806. This example illustrates a drastic scene change due to the camera panning and zoom-in operations. As a result, the top row and the middle row of the example of FIG. 8 appear to be from different scenes. The new montage module 112 generates video summary montage 116 from such types of videos by fusing the important portions of the various scenes in short duration.

Figure 9:
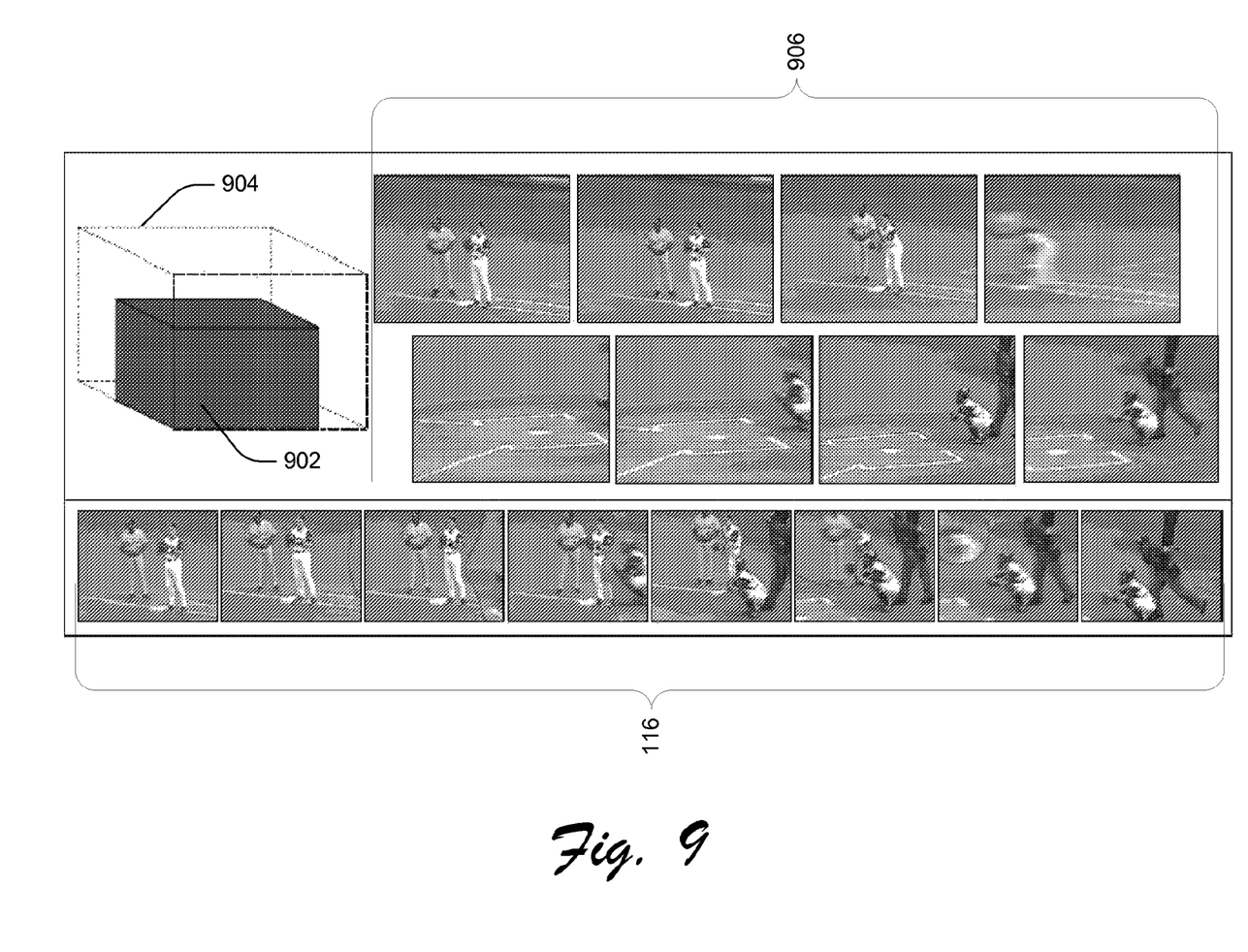
FIG. 9 shows exemplary results of space-time scale down operations of original input video data, according to one embodiment.

FIG. 9 shows exemplary results of space-time scale down operations of the systems and methods for space-time video montage, according to one embodiment. In this example, output video volume 902 is spatially and temporally smaller than the input video volume 904. The top two rows show eight images from the original baseball scene video 906 (i.e., the input video data sequence). In this example, the input baseball scene video includes 88 frames with resolution 320×240, although different numbers of frames and resolution could have been used. In this example, output video volume comprises 44 frames (i.e., video summary montage 116) with resolution 220×176. In this example, the input video data sequence 906 has much visual redundancy. Video montage module 112 generates a compact and informative small video 116 from this redundant input video data sequence.

Figure 10:
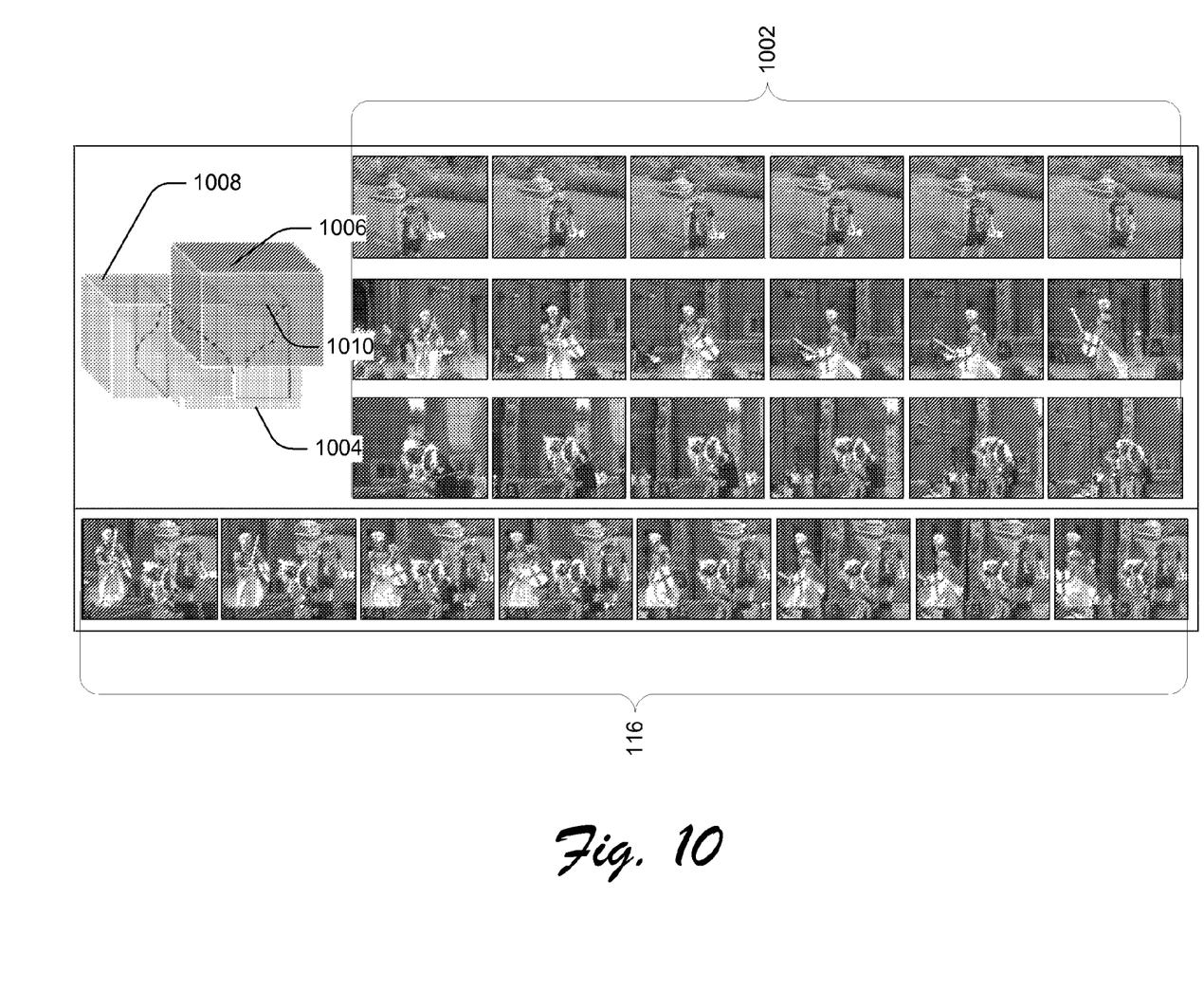
FIG. 10 shows exemplary results of using multiple input video data sequences together to generate a single video summary montage for presentation to a user, according to one embodiment.

FIG. 10 shows exemplary results of using multiple input video data sequences to generate a single output video summary montage 116, according to one embodiment. In this example, the top three rows if image frames represent three respective input video data sequences 1002. In this implementation, each input video data sequence is from a respective different video clip, although all three could represent different portions of a same video sequence. For purposes of exemplary illustration, the input video data sequences 1002 respectively contains 69, 71, and 84 frames at a resolution of 320× 240 (different frame numbers and resolution can be used). As illustrated, the three input videos 1002 are packed and merged/unified in output video summary montage 116 (shown in the bottom row). In this example, several frames of the video summary montage 116 are shown, each with a respective resolution of 320×240. Video volumes 1004, 1006, and 1008 represent input video data sequence volumes. Video summary montage 116 is generated in the output video volume 1010.

An Exemplary Procedure

Figure 11:
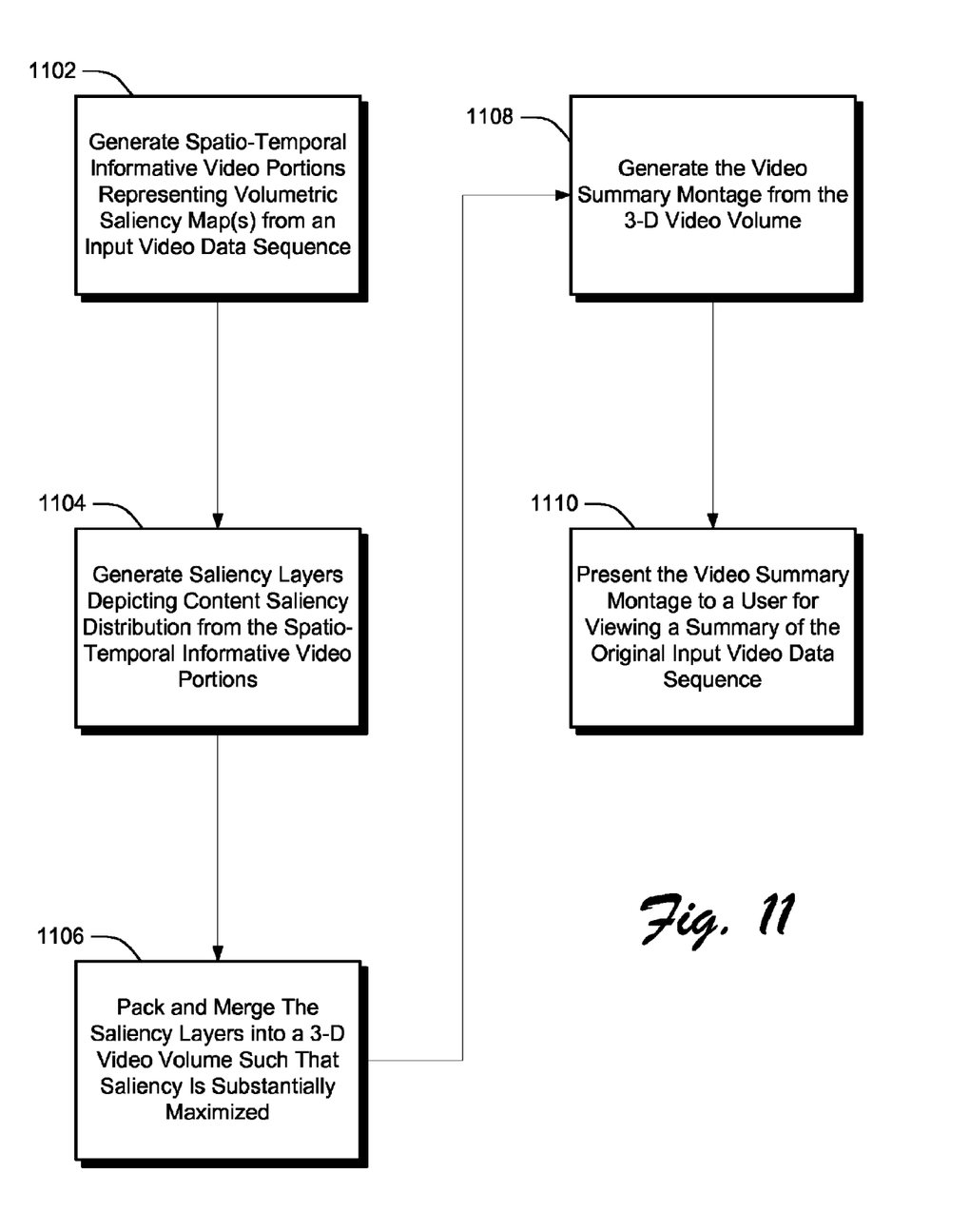
FIG. 11 shows an exemplary procedure for space-time video montage, according to one embodiment.

FIG. 11 shows an exemplary procedure 1100 for space-time video montage, according to one embodiment. For purposes of exemplary illustration, the operations of procedure 1100 are described with respect to the above described aspects of FIGS. 1-10. In one implementation, the operations of procedure 1100 are implemented by video montage module 112. Operations at block 1102 analyze an input video data sequence to locate and extract spatio-temporal informative (salient) video portions 120 from the input video data. The spatio-temporal informative video portions 110 represent volumetric saliency map(s). Operations of block 1104 represented the volumetric saliency map portions as saliency layers 122 depicting content saliency distributions. Operations of block 1106 pack and merge the saliency layers 122 into a 3-D video volume 124. Operations of block 1108 generate a video summary montage 116 from the 3-D video volume 124 by representing respective ones of the representative image frames (pixel data) of the 3-D video volume with respect to the corresponding timeline. Operations of block 1110 present the video summary montage 116 to a user.

CONCLUSION

Although space-time video montage has been described with reference to FIGS. 1-11 in language specific to structural features and/or methodological operations or actions, it is understood that the implementations defined in the appended claims are not necessarily limited to the specific features or actions described. For example, the above description for space-time video montage of system 100 has been described with respect to generating a video summary 116 from a single input video data sequence (i.e., m=1, a single input video). In a different implementation, however, video montage module 112 generates a video summary 116 from multiple input video data sequences (i.e., m>1). In this alternate implementation, multiple input video data sequences are processed analogous as if the data were provided from a single input video data sequence (please see FIG. 10 and corresponding description). Accordingly, the specific features and operations discussed above are disclosed as exemplary forms of implementing the following claimed subject matter.

The invention claimed is:

1. A method at least partially implemented by a computing device, the method comprising:
   identifying one or more arbitrary space-time volumes representing one or more informative video portions of at least one input video data sequence;
   segmenting the one or more informative video portions to generate one or more volumetric saliency blobs, each of the one or more volumetric saliency blobs comprising a high saliency video portion;
   dilating the one or more volumetric saliency blobs using respective one or more mask volumes to simulate spread of respective high saliency video portions of the one or more volumetric saliency blobs on respective surrounding portions of the one or more volumetric saliency blobs to form one or more volumetric saliency layers; and
   generating a video summary montage of the at least one input video data sequence based on the one or more volumetric saliency layers.

2. The method of claim 1, wherein the video summary montage represents a spatial scale-down of the at least one input video data sequence, a temporal scale-down of the input video data sequence, or a space-time scale down of the input video data sequence.

3. The method of claim 1, wherein the at least one input video data sequence is multiple input video data sequences, each input video data sequence representing a different video clip.

4. The method of claim 1, wherein the method further comprises:
   analyzing spatio-temporal information distribution in the at least one input video data sequence to locate the one or more arbitrary space-time volumes;
   wherein the video summary montage is based on an arrangement of at least a subset of the information associated with the one or more volumetric saliency layers.

5. The method of claim 1, wherein the method further comprises presenting the video summary montage to a user.

6. The method of claim 1, wherein the method further comprises:
   identifying, for each volumetric saliency layer, relative saliency distributions of pixels in the saliency layer; and
   wherein the video summary montage is generated based on the relative saliency distributions of pixels across the one or more volumetric saliency layers.

7. The method of claim 6, wherein identifying the relative saliency distributions further comprises, with respect to the at least one input video data sequence, locating high saliency portions, mid-level saliency portions, and low-level-saliency portions.

8. The method of claim 6, wherein identifying the relative saliency distributions further comprises dilating high-saliency portions of the at least one input video data sequence to simulate effect of the high-saliency portions on adjacent pixels.

9. The method of claim 6, wherein identifying the relative saliency distributions further comprises assigning negative saliency values to respective ones of the pixels in a least a subset of the one or more volumetric saliency layers, the negative saliency values indicating preference of higher salient portions of pixels in one or more different layers of the one or more volumetric saliency layers.

10. The method of claim 1, wherein the method further comprises:
    identifying, for each volumetric saliency layer, relative saliency distributions of pixels in the saliency layer; and
    packing and merging data associated with the one or more volumetric saliency layers into a 3-D video volume based on the relative saliency distributions of pixels in the one or more volumetric saliency layers, the 3-D video volume being the video summary montage.

11. The method of claim 10, wherein each pixel in the 3-D video volume is associated with a respective saliency measurement.

12. The method of claim 10, wherein at least one of the one or more volumetric saliency layers that have been packed and merged into the 3-D video volume overlap one or more different ones of the one or more volumetric saliency layers.

13. The method of claim 10, wherein the packing is based on a first-fit algorithm and wherein the merging is based on a graph cut optimization algorithm.

14. The method of claim 10, wherein the packing further comprises positioning the one or more volumetric saliency layers in the 3-D video volume to maximize overall saliency in the 3-D video volume based on the relative saliency distributions of pixels in the one or more volumetric saliency layers.

15. The method of claim 10, wherein the merging is based on a set of soft constraints that maximize saliency, maximize continuity of high-saliency portions, and maximize color smoothness at scene boundaries of the one or more volumetric saliency layers.

16. A computing device comprising:
    one or more processors; and
    memory coupled to the processor, the memory storing computer-program instructions executable by the one or more processors, the computer-program instructions when executed by the one or more processors performing operations comprising:

extracting visually informative space-time portions from video frames of an input video data sequence, the informative space-time portions including spatio-temporal saliency measuring salient texture of the visually informative space-time portions on each of the video frames;

segmenting the visually informative space-time portions to obtain volumetric saliency layers, each volumetric saliency layer including a single saliency portion of the visually information space-time portions;

positioning at least a subset of the volumetric saliency layers into a 3-D video volume to maximize saliency of pixels in the 3-D video volume; and merging data associated with the at least subset of the volumetric saliency layers in the 3-D video volume to regulate continuity of high-saliency portions of the pixels and provide color coherence at boundaries between respective ones of pixels in the volumetric saliency layers, wherein the 3-D video volume represents a video summary montage of the input video data sequence.

17. The computing device of claim 16, wherein the method further comprises presenting the video summary montage to a user.

18. The computing device of claim 16, wherein the segmenting comprises:

locating in the visually informative space-time portions, high-level saliency portions, mid-level saliency portions, and low-level saliency portions;

dilating the high-level saliency portions of the visually informative space-time portions to simulate effect of the high-level saliency portions on adjacent pixels; and assigning negative saliency values to respective ones of the pixels in the at least subset of the volumetric saliency layers, the negative saliency values indicating preference of higher salient portions of pixels in one or more different layers of the volumetric saliency layers.

19. The computing device of claim 16, wherein one or more of the volumetric saliency layers overlap one or more different ones of the volumetric saliency layers in the 3-D video volume.

20. A computing device comprising:

a processor; and a memory coupled to the processor, the memory comprising computer-program instructions executable by the processor, the computer-program instructions when executed by the processor for performing operations comprising:

receiving an input video data sequence;

assigning saliency values to each pixel of the input video data sequence to obtain a saliency volume, the saliency volume comprising one or more spatio-temporal informative video portions of the input video data sequence;

segmenting the one or more spatio-temporal informative video portions to generate one or more volumetric saliency blobs, each of the one or more volumetric saliency blobs comprising a set of pixels representing a high saliency video portion;

dilating the one or more volumetric saliency blobs using respective one or more mask volumes to simulate spread of respective high saliency video portions on respective surrounding portions to form at least a first volumetric saliency layer and a second volumetric saliency layer;

for the first volumetric saliency layer, assigning positive saliency values to locations corresponding to the high saliency portions of the first volumetric saliency layer, and assigning negative values to locations corresponding to the high saliency portions of the second volumetric saliency layer, wherein the negative values are used to reduce the importance of the high saliency portions of the second volumetric saliency layer in the first volumetric saliency layer;

positioning at least a subset of information associated with the first and second volumetric saliency layers into a 3-D video volume to maximize saliency of pixels in the 3-D video volume;

merging data associated with the at least a subset of the information in the 3-D video volume to regulate continuity of high-saliency portions of the pixels and provide color coherence at boundaries between respective ones of pixels in the one or more volumetric saliency layers;

and presenting the 3-D volume as a video summary of the input video data sequence.

* * * * *